United States Patent [19]
Lieser

[11] 3,991,456
[45] Nov. 16, 1976

[54] METHOD OF FORMING VALVE BODIES
[75] Inventor: Mathias J. Lieser, Chicago, Ill.
[73] Assignee: Stanray Corporation, Chicago, Ill.
[22] Filed: May 6, 1974
[21] Appl. No.: 467,008

Related U.S. Application Data
[62] Division of Ser. No. 242,589, April 10, 1972, abandoned.

[52] U.S. Cl. .................. 29/157.1 R; 29/421 R; 29/557; 72/55; 72/56
[51] Int. Cl.[2] .................................... B23P 15/00
[58] Field of Search ............... 29/157.1 R, 421, 558, 29/157 C, 157 T, 557; 72/55, 56; 83/177, 53

[56] References Cited
UNITED STATES PATENTS

| 308,707 | 12/1884 | Shirk .................... 408/230 |
| 2,238,212 | 4/1941 | Cornell, Jr. .................... 29/157 T |
| 2,280,204 | 4/1942 | Tracy .................... 83/177 |
| 2,707,921 | 5/1955 | Jorgensen et al. .................... 29/558 |
| 2,732,897 | 1/1956 | Musser .................... 83/177 |
| 2,934,813 | 5/1960 | Nippert .................... 29/558 |
| 3,158,119 | 11/1964 | Thaller et al. .................... 72/56 |
| 3,204,266 | 9/1965 | Carter, Jr. et al. .................... 29/558 |
| 3,457,954 | 7/1969 | Nyberg .................... 29/558 |
| 3,495,486 | 2/1970 | Fuchs, Jr. .................... 83/53 |
| 3,557,446 | 1/1971 | Charschan .................... 29/421 |

Primary Examiner—C.W. Lanham
Assistant Examiner—Daniel C. Crane
Attorney, Agent, or Firm—Robert E. Wagner; Robert E. Browne

[57] ABSTRACT

A method is disclosed of forming valve bodies of the spool valve type wherein sharp edges around the port openings in the interior chamber of the valve are eliminated. This is accomplished by blowing holes through the chamber wall to form the ports within the interior chamber. A tool is first used to bore partially through the valve body to leave a very thin annular portion which is readily parted when high pressure is applied to the interior chamber of the valve.

7 Claims, 7 Drawing Figures

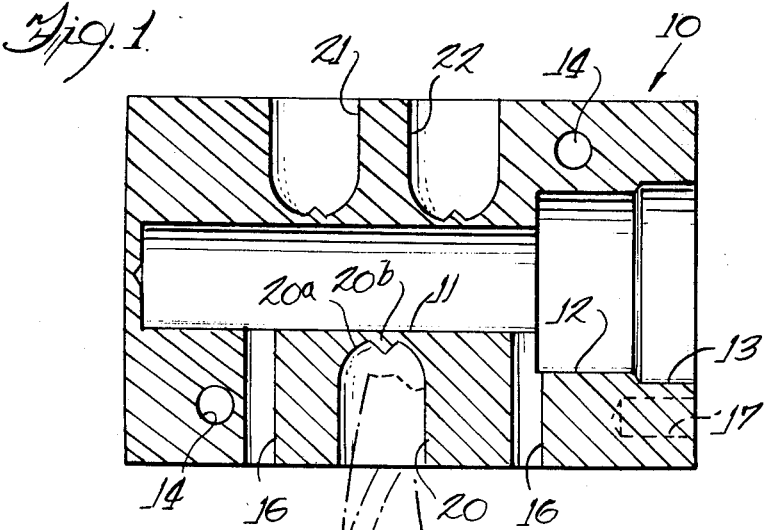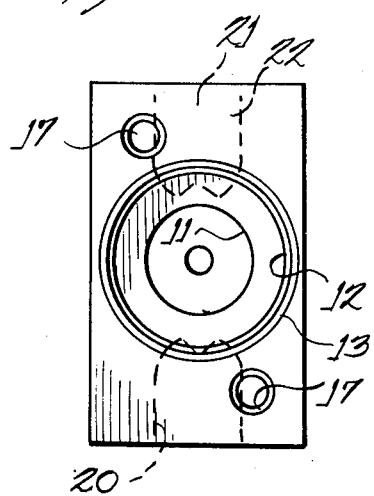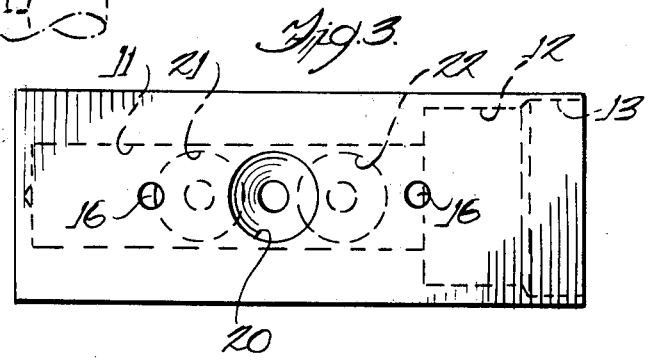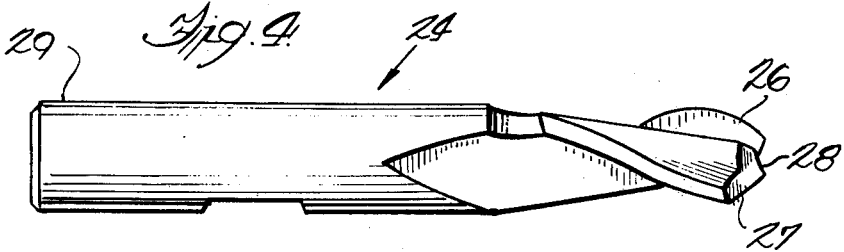

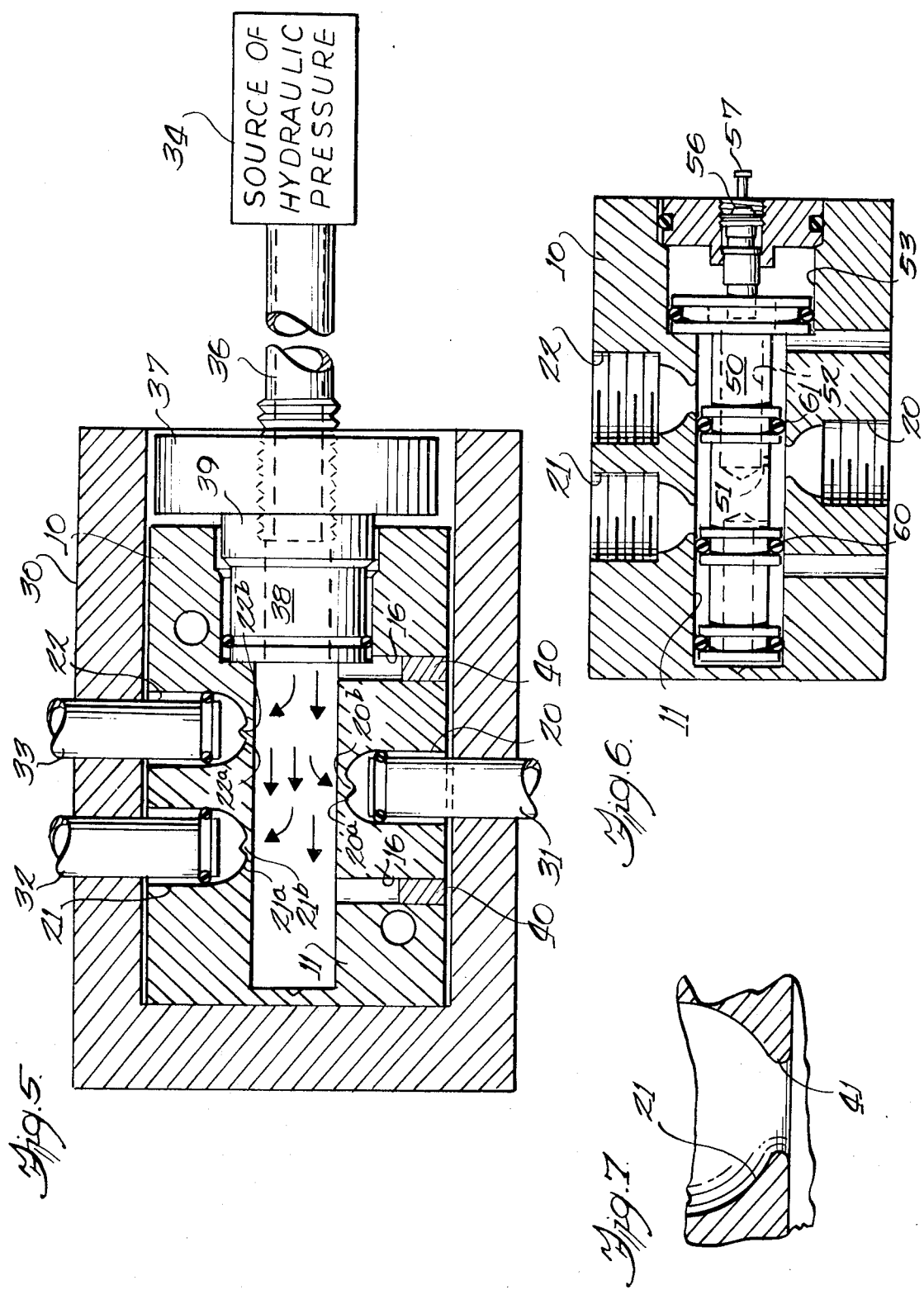

METHOD OF FORMING VALVE BODIES

This is a division of application Ser. No. 242,589 filed Apr. 10, 1972, now abandoned.

BACKGROUND OF THE INVENTION

This invention relates generally to a method of making valve bodies and the valve formed thereby, and more particularly to a method of making valve bodies for spool valves or the like.

Spool valves have cylindrical bores through the valve body with an axially shiftable central core or slide element movable therein to control the fluid flow from an inlet port to one or more outlet ports. Such spool valves have use as pilot valves, or the like, and are relatively simple and inexpensive to manufacture. However, because of the nature of construction of spool valves, their reliability over a long life is somewhat questionable. Spool valves of the type described above generally have O-rings inserted in grooves about the enlarged diameter portions of the slide element and these O-rings form the fluid seals between the respective chambers within the cylindrical bore. The inlet and outlet ports are formed by drilling or the like external passages from the outside of the spool valve to the interior thereof. By forming the inlet and outlet ports in this manner, a sharp peripheral edge is formed at the mating portions of the port orifice and the internal chamber wall of the cylindrical bore. By having these sharp ridges or edges about the periphery of the ports the O-rings passing over the ports tend to wear or be cut. Because spool valves are generally of relatively small construction, it is difficult, if not impossible, to eliminate these sharp edges by conventional manufacturing techniques used heretofore.

SUMMARY OF THE INVENTION

Accordingly, it is an object of this invention to provide a method of forming valve bodies wherein the contiguous edge portions between inlet and outlet ports and the internal chamber of the valve body are provided with rounded edges.

Another object of this invention is to provide a method of forming ports in valve bodies from within the valve chamber.

Briefly, a method of this invention incorporates the step of forming, either by drilling or other suitable means, a plurality of lateral bores within the valve body which extend very close to but do not sever the interior walls of the valve chamber. These bores have peripheral edge portions which are thinner than their central portion. A source of high pressure, either pneumatic, hydraulic, or explosive, is provided within the valve chamber so that each of the thin wall portions adjacent the ports to be formed are blown outward from the valve chamber into the corresponding lateral bores. Each of the valve ports so formed is provided with a plug or stop so that total pressure is not lost when one of the wall segments breaks away before the others. The high pressure or explosive force within the valve chamber is of sufficient magnitude to completely round off the peripheral edge of the port adjacent the interior chamber wall.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is an elevational sectional view showing a valve body constructed in accordance with the method of this invention;

FIG. 2 is an end view of the valve body of FIG. 1;

FIG. 3 is a top view of the valve body of FIG. 1;

FIG. 4 is an elevational view of a tool used to form the lateral bores partially through the valve body before explosive force is used to complete forming the ports;

FIG. 5 is an elevational sectional view diagrammatically illustrating forming the ports in the valve body of this invention;

FIG. 6 is an elevational sectional view showing a totally assembled valve structure made by the method of this invention; and FIG. 7 is an enlarged detailed sectional view showing the rounded configuration of the peripheral edge of the valve port adjacent one internal bore of the valve.

DETAILED DESCRIPTION OF THE ILLUSTRATED EMBODIMENTS

Referring now to FIGS. 1, 2 and 3 there is seen a valve body 10 constructed in accordance with the method of this invention. The valve body 10 includes a cylindrical interior chamber 11 formed by drilling or other suitable means and has an enlarged diameter portion 12 which will form a control chamber for the valve. A further enlarged diameter portion 13 is immediately adjacent the control chamber area is provided to receive an end cap to seal the interior of the valve. The valve body is illustrated as being rectangular in the cross section and is preferably of the type known as a spool valve which can be used as a pilot valve.

A pair of transverse mounting holes 14 is provided through the valve body to provide means to secure it to a bulkhead or other support. Also, a pair of bleed ports 16 extend through the valve body and are in fluid communication with the cylindrical interior chamber 11. Threaded apertures 17 at the open end of the valve body are provided for receiving fasteners to secure the end cap to the valve body when assembled.

In accordance with the method of this invention a plurality of bores 20, 21 and 22 are formed in the valve body ultimately to form a single inlet and a pair of outlet ports, respectively. The bores 20, 21 and 22, when initially formed, extend only partially through the valve body and have their annular potions in close proximity to the interior wall surface of the chamber 11. All three bores are substantially identical and, therefore, only a detailed description will be given with regard to the bore 20. Here it can be seen that a thin annular portion 20a is formed about a thick central portion 20b. This is formed by a tool 24, FIG. 4, which has a tip 26 having a rounded portion 27 and a detent or recessed central portion 28. The tool 24 has a shank 29 insertable into a drill press or the like for controlling the depth of penetration into the valve body 10 so that the tip of the drill does not enter the interior chamber 11.

Referring now to FIG. 5 the method of this invention is further illustrated. Here the valve body is inserted into a receptacle 30 and plug means 31, 32, and 33 are inserted through the receptacle 30 and into the bores 20, 21, and 22, respectively. A source of hydraulic pressure 34 is applied to the interior chamber 11 through a conduit 36 threadedly secured to a removable end cap 37. The end cap 37 has a cylindrical configuration and reduced diameter portions 38 and 39 corresponding substantially to the diameter of the control chamber portions 12 and 13 of the valve body so that the end cap can be inserted therein to form a seal. Also, temporary plug means 40 may be inserted into the bleed ports 16 to prevent hydraulic fluid from escaping therefrom into the receptacle 30. The receptacle 30 is used to reinforce the wall structure of the valve body 10 so it will not expand or otherwise be deformed during application of the high hydraulic pressure. Furthermore, it will be understood that the hydraulic pressure source 34 can be replaced with pneumatic pressure means or an explosive discharge means such as that produced by explosive fuels or the like.

After the valve body 10 is inserted into the receptacle 30 and the plugs inserted to the corresponding bores, the hydraulic pressure is applied to the interior chamber 11 and increased until the reduced diameter portions 21a, 21a and 21b are blown away under extreme force so that the edge portions thereof which are immediately adjacent to the interior wall surface are rounded inwardly of the respective port as best seen in the enlarged fragmentary view of FIG. 7. That is, the opening of the inlet and outlet ports is initiated into the interior chamber by a rounded inwardly turned edge 41 rather than a sharp edge heretofore provided by drilling straight through the valve body. This rounded edge then eliminates excessive wear of the O-rings as they pass over the various port openings during reciprocal movement of the spool element within the valve body.

The plug means 31, 32 and 33 are inserted into the respective bores so as to minimize the volume behind the port opening to be formed. Therefore, once rupture of one of the reduced diameter portions 20a, 21a and 22a occurs, there will be only a slight loss in hydraulic pressure until the small chamber behind the port then just formed is filled and hydraulic fluid pressure will again bulid up until the other reduced diameter portions are blown inwardly of the port. The order in which the reduced diameter portions will be blown away is random and does not affect the quality of the respective rounded edges as to whether one is blown away before the other.

Therefore, the method of this invention is one in which inexpensive and reliable valve body structures are formed which do not have sharp edges in the interior chamber thereof to cause excessive wear of O-rings which traverse the port openings. By drilling the bores to a predetermined depth but not completely through the interior wall of the chamber 11 and then exploding through the interior walls at the reduced diameter portions of the bores.

Referring now to FIG. 6 a detailed showing is made of a valve body constructed in accordance with the principles of this invention and all its associated components used in the valve are shown. The valve body 10 is equipped with a spool or slide element 50 positioned within the interior chamber 11 to shuttle back an forth so as to alternately place the inlet port 20 in fluid communication with either the outlet port 21 or the outlet port 22 at any given time. The slide element 50 is maintained in the far left hand position, as shown in FIG. 6, by the pressure at the inlet port 20 being applied through a bleed port 51 and recess 52 to a control chamber 53 to exert pressure on the right hand side of an enlarged diameter portion 54. The area of the enlarged diameter portion 54 is greater than the area of the lesser diameter central and end portions of the slide element and therefore equal pressure on both sides will cause the slide element to be urged to the left. To move the slide element axially to the right a manually operated tire value element 56 is provided and when the stem 57 thereof is depressed the control chamber 53 is vented to atmosphere. This will shift the slide element 50 and place the inlet port 20 in fluid communication with the outlet port 22. Upon release of the manually operated tire valve 56 pressure will again build up in the chamber 58 to shift the slide element 50 back to the left position. This shuttle action or axial movement of the slide element causes a pair of O-rings 60 and 61 to slide over the openings of the ports but, as these openings have rounded edges, minimum or no wear of the O-rings will occur.

It will be understood that other valve configurations may be formed without departing from the spirit and scope of the novel concepts disclosed and claimed herein.

The invention is claimed as follows:

1. A method of forming a valve body comprising the steps of: forming a valve body member, forming an interior chamber within said valve body member, forming a partial bore into a side wall of the valve body member, said bore terminating at a predetermined distance from a wall of said interior chamber of the valve body member, applying pressure to the interior chamber of the valve body member, and blowing a hole through that portion of said wall of said interior chamber of the valve body member immediately behind the terminating end of said partial bore, the pressure thus provided for blowing the hole being sufficient to inwardly round the peripheral edges of the hole by displacing the material therefrom.

2. The method of forming a valve body according to claim 1 wherein a plurality of partial bores are formed in one or more side walls of the valve body to provide a plurality of ports into the interior chamber wall thereof.

3. The method of forming a valve body according to claim 2 further including inserting pressure stop means into said plurality of partial bores so that after blowing through of one bore from the interior chamber wall pressure is again maintained until the bores are blown through.

4. The method of forming a valve body according to claim 3 wherein said interior chamber wall is formed of a cylindrical bore extending into said valve body and said partial bores are formed in side walls of said valve body and perpendicular to the axis of said cylindrical bore.

5. The method of forming a valve body according to claim 4 wherein said cylindrical bore is adapted to receive a slide element to form a spool valve with said valve body.

6. The method of forming a valve body according to claim 1 wherein the pressure applied to said interior chamber is hydraulic pressure.

7. The method of Claim 1 of forming a valve body wherein said partial bore into a side wall of the body is formed by a tool comprising: a shank having one end adapted for insertion into a drill press, a cutting tip formed at the other end of said shank and a recess formed in the center of said cutting tip with the portion about said recess forming the deepest part of a bore formed by the tool whereby a bore having a peripheral edge portion and a central portion is formed and said edge portion is thinner than said central portion to facilitate blowing said hole and rounding the peripheral edges of the hole.

* * * * *